United States Patent
Richard et al.

(10) Patent No.: US 7,112,300 B2
(45) Date of Patent: Sep. 26, 2006

(54) LADLE BOTTOM

(75) Inventors: Johan Richard, Dundas (CA);
Lawrence J. Heaslip, Burlington (CA);
James D. Dorricott, Burlington (CA)

(73) Assignee: Vesuvius Crucible Company,
Wilmington, DE (US)

( * ) Notice: Subject to any disclaimer, the term of this patent is extended or adjusted under 35 U.S.C. 154(b) by 0 days.

(21) Appl. No.: 10/503,191

(22) PCT Filed: Jan. 31, 2003

(86) PCT No.: PCT/US03/02892

§ 371 (c)(1),
(2), (4) Date: Jul. 30, 2004

(87) PCT Pub. No.: WO03/072285

PCT Pub. Date: Sep. 4, 2003

(65) Prior Publication Data

US 2005/0127582 A1    Jun. 16, 2005

Related U.S. Application Data

(60) Provisional application No. 60/354,903, filed on Feb. 5, 2002.

(51) Int. Cl.
*C21B 3/00* (2006.01)

(52) U.S. Cl. .................. 266/275; 266/230; 222/594
(58) Field of Classification Search ............... 266/230, 266/227, 275; 222/594
See application file for complete search history.

(56) References Cited

U.S. PATENT DOCUMENTS

| 4,746,102 A | * | 5/1988 | Gilles et al. ............... 266/275 |
| 5,196,051 A | | 3/1993 | Heaslip |
| 5,879,616 A | | 3/1999 | Erny |

* cited by examiner

*Primary Examiner*—Scott Kastler
(74) *Attorney, Agent, or Firm*—James R. Williams

(57) ABSTRACT

The present invention relates to a metallurgical ladle and more particularly to the bottom of the ladle having an outlet through which the molten metal can drain. An object of the present invention is to increase the efficiency of a ladle draining operation, including reducing the amount of discarded metal, avoiding the premature flow of slag through the outlet, and reducing the contamination of slag in the molten metal effluent. The ladle bottom comprises a plurality of terraces and flow channels, ultimately directing the stream of molten metal to an outlet of the ladle. The terraces are described as capturing slag and the channels permit molten metal to flow preferentially through the outlet.

11 Claims, 2 Drawing Sheets

LADLE BOTTOM

FIELD OF THE INVENTION

This invention relates generally to refractory article and, more particularly, to a refractory shape used in the transfer of molten metal in a continuous casting operation.

BACKGROUND

A ladle is a vessel that is used to hold or transport a batch of liquid metal during metallurgical operations. A layer of slag frequently covers the top surface of the liquid metal, such as in the production of steel. When desired, the liquid metal may be drained from the ladle though an outlet located in the ladle bottom. While draining, the metal will, desirably and advantageously, completely empty from the ladle without contamination of the metal by slag. Contamination is undesirable and may cause difficulties in casting or refining operations as well as defects in the intermediate or final metal products.

Slag contamination can occur from both floating and entrained slag. Slag is typically less dense than liquid metal and generally floats in a separated layer on the surface of a quiescent batch of liquid metal. During the pouring of the liquid metal, slag can become entrained within the flowing stream. Entrainment is the presence of slag particles in the molten steel. Entrainment often occurs when turbulence disturbs the interface between molten metal and slag. Such turbulence can cause molten metal and slag to mix. Under quiescent conditions, entrained slag would eventually float to the surface; however, the turbulence of casting can maintain a substantial amount of entrained slag in the molten metal. Ideally, any solution to the problem of slag contamination would address both floating and entrained slag.

As the metal drains from the ladle, the floating slag approaches the outlet and the likelihood of contamination of the metal stream by slag increases. An operator will stop the pour when he detects slag in the molten metal stream exiting the ladle. The operator may even stop the pour prematurely to avoid slag in the ladle outflow. The slag and metal remaining in the ladle are discarded. Discarding metal decreases yield, which is costly and inefficient but, at the same time, is necessary to reduce slag contamination.

Various methods and articles exist to detect slag in the ladle or the ladle outflow. Frequently, these methods require action by the operator and include electronic and sonic detection devices that are placed inside and outside the ladle. For example, a detector placed in the ladle can detect a drop in the level of molten metal by measuring a change in electrical resistivity when floating slag intersects the submerged detector. Similarly, sonic pulses can identify the presence of slag in the ladle outflow. Both techniques only detect the presence of slag and do not actively decrease the presence of slag in the outflow.

Prior art includes article designed to reduce the outflow of slag from the ladle. U.S. Pat. Nos. 4,746,102 and 5,879,616 teach ladle bottoms having a small well immediately above the ladle outlet. Both patents describe the well as preferentially collecting molten metal instead of slag, thereby improving yield as the ladle empties. Unfortunately, the patents only prevent floating slag from exiting the ladle. Entrained slag is free to exit the ladle.

U.S. Pat. No. 5,196,051 describes a ladle bottom for reducing entrained slag. The ladle bottom comprises means for entrapping slag before the slag reaches the ladle outlet. The means extend upwards from the ladle bottom and include elongated castellations that approach the outlet. One embodiment shows castellations radiating symmetrically from the outlet. The symmetrical castellations are described as reducing vortexing, which leads to slag entrainment. Notably, the castellations are not described as promoting a reduction of entrained slag already present in the molten metal.

Prior art does not teach a ladle bottom that simultaneously reduces the outflow of both entrained slag and floating slag. A need remains for an article capable of capturing entrained slag and allowing molten metal to flow from a ladle before floating slag.

SUMMARY OF THE INVENTION

An object of the present invention is to increase the efficiency of a ladle draining operation, including reducing the amount of discarded metal, avoiding the premature flow of slag through the outlet, and reducing the contamination of slag in the molten metal effluent.

The present invention relates to a metallurgical ladle and more particularly to the bottom of the ladle having an outlet through which the molten metal can drain and a method to increase the fraction of liquid metal that can be drained from the ladle through the outlet without contamination by slag.

The invention includes a ladle bottom comprising a plurality of terraces and flow channels, ultimately directing the stream of molten metal to an outlet of the ladle. The terraces and channels are in the surface of the ladle bottom that is exposed to the liquid metal.

A plurality of uppermost terraces comprises generally horizontal faces that are substantially separated by at least one flow channel comprising sidewalls and a bottom face. The terraces permit entrained slag to precipitate from the molten metal. The channel allows uncontaminated liquid metal to flow to the outlet hole and drain from the ladle even when the metal level is very low and the floating slag layer is closely approaching the outlet.

The flow channel may have a plurality of branches, which allow the collection of liquid metal from regions of the ladle that are remote from the outlet. The flow channel then feeds the collected metal to the outlet. In a preferred embodiment, the depth of the channel increases in steps towards the outlet and terminates in a deepest face surrounding the outlet.

DETAILED DESCRIPTION OF THE INVENTION

Figure 1:
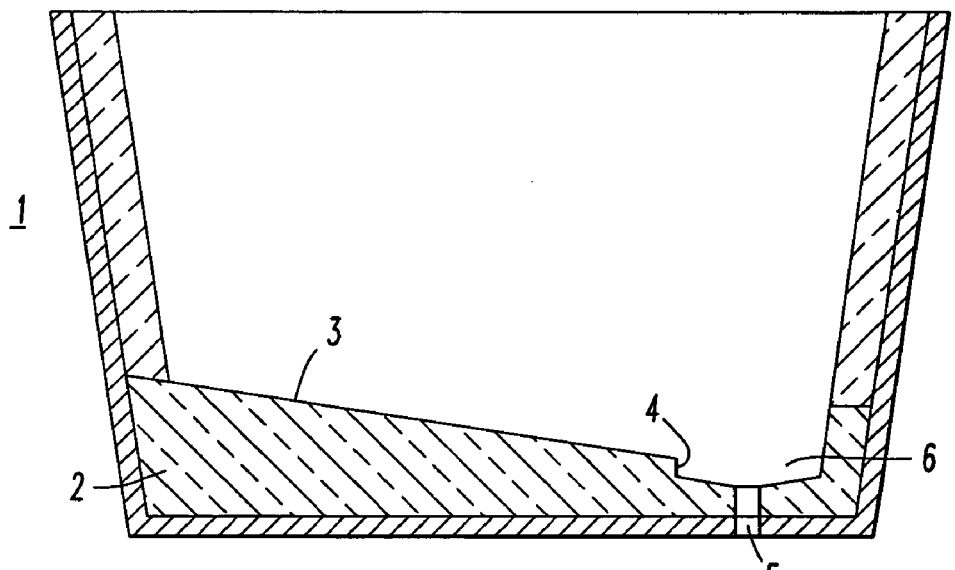
FIG. 1 is a cross-section of a prior art ladle, including the ladle bottom and outlet.

FIG. 1 shows a ladle 1 of the prior art having a bottom 2. The bottom 2 comprises an inclined portion 3 and a vertical portion 4 adapted to direct molten metal in the ladle 1 to an outlet 5. The vertical portion 4 creates a well 6 immediately above the outlet 5. Molten metal is directed to the outlet 5 by the inclined portion 3, and collects in the well 6 before any slag, which may be floating on the molten metal. The well 6 is described as increasing the amount of molten metal that can pass through the outlet 5 before floating slag contaminates the outflow.

Figure 2:
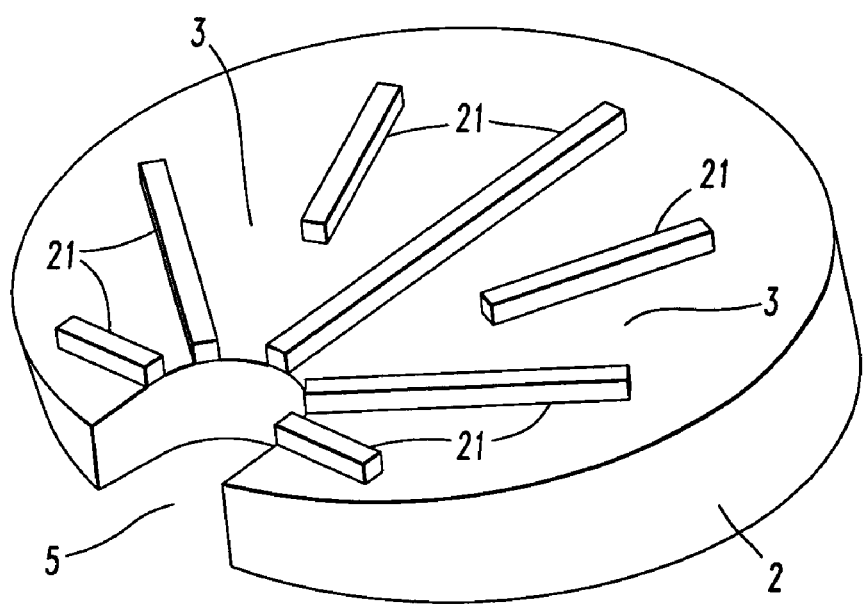
FIG. 2 is perspective view of a prior art ladle bottom having castellations radiating from the outlet.

FIG. 2 shows another ladle bottom 2 of the prior art having an inclined surface 3 directed toward the outlet 5. Molten metal, being heavier than slag, is expected to reach the outlet 5 before any floating slag. A plurality of castellations 21 rises from the inclined surface 3. The castellations are described as reducing vortexing, thereby decreasing the likelihood slag will entrain in the molten metal. Less entrained slag would presumably decrease the amount of slag in the outflow. Only the inclination of the bottom 2 deters floating slag from exiting the ladle.

Figure 3:
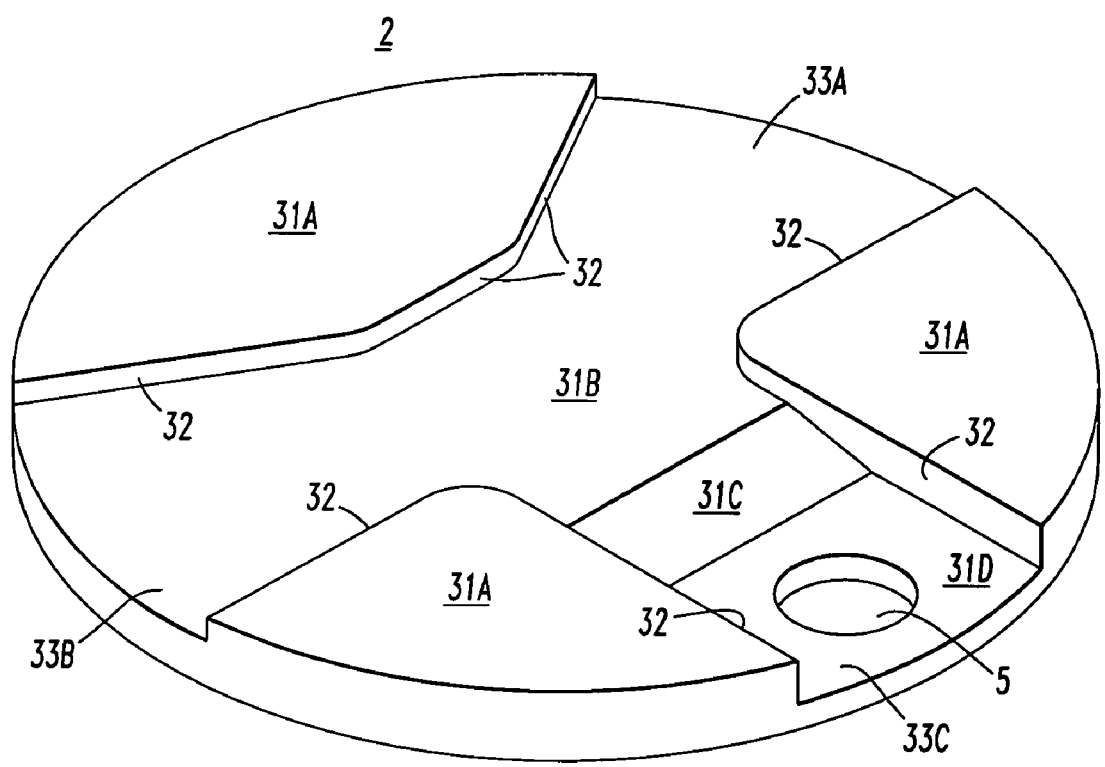
FIG. 3 is a perspective view of a ladle bottom of the present invention.

FIG. 3 shows one embodiment of a ladle bottom 2 of the present invention. Not shown are the walls of the ladle that would surround the bottom and extend upward from the ladle bottom 2 to contain the liquid metal and slag. The ladle bottom includes an outlet 5, which is normally at the low point of the ladle. The bottom 2 also comprises a plurality of faces 31 and sidewalls 32 that are exposed to the liquid metal. Sidewalls 32 are preferably substantially vertical relative to the faces 31. The sidewalls 32 may also be curved, chamfered, or otherwise shaped to permit head pressure on the flow above the outlet and decrease slag contamination.

The faces 31 include a plurality of uppermost faces 31A, which are generally horizontal. In association with adjacent sidewalls 32, the uppermost faces define terraces. The terraces may be at different heights relative to the outlet. The terraces may also vary in thickness depending on casting conditions, such as the type and grade of molten metal, use of gas purging, impact on the ladle bottom during filling with molten metal, expected erosion, etc.

The remaining faces 31 include at least one intermediate face 31B, at least one sloping face 31C, and at least one outlet face 31D. Intermediate face 31B is higher above the outlet 5 than sloping face 31C and outlet face 31D but at a lower level than uppermost faces 31A. Intermediate face 31B converges toward the sloping face 31C. Preferably, the intermediate face 31B is inclined toward sloping face 31C.

Sloping face 31C slopes upward from the outlet face 31D to intermediate face 31B, thereby defining an elevation drop from the intermediate face 31B to the outlet face 31D. The inclination of the sloping face 31C is greater than the average inclination of the intermediate face 31B, and can vary from a gentle slope to a perpendicular drop depending on conditions. As the slope of the sloping face 31C approaches perpendicular, the combination of sloping face 31C, sidewalls 32 and outlet face 31D may define a well around the outlet 5.

The outlet face 31D includes the outlet 5 and is preferably is shaped to direct molten metal toward the outlet 5. The outlet face 31D should be the lowest face 31 to ensure a higher yield of molten metal outflowing from the ladle.

The sidewalls 32 and lower faces 31B–D form a flow channel 33. The present embodiment shows a flow channel 33 having three branches 33A–C, which separate the uppermost faces 31A from one another. At least one branch is an outlet branch 33C. The branches may each be at different heights and, preferably, the outlet branch 33C including face 31D is the lowest.

During casting, both floating and entrained slag tend to settle on uppermost faces 31A as liquid metal drains into the flow channel 33. Any remaining slag then tends to settle on the intermediate face 31B as molten metal flows down the sloping face 31C, the outlet face D, and through the outlet. A sharply inclined sloping face 31C can define a well, which reduces contamination of the outflow by floating slag.

Terracing the ladle bottom while providing flow channels for liquid metal permits the liquid metal to exit the outlet with reduced slag contamination. The terraces and sidewalls, collect or trap slag while permitting molten metal to continue towards the outlet. This phenomenon takes advantage of the lower density of slag and its higher viscosity in comparison to liquid metal.

Slag movement toward the outlet is retarded by friction against the ladle bottom. The present invention takes advantage of this fact by creating a plurality of slag-entrapping features. For example, as the liquid metal and slag settle onto an uppermost terrace, the molten metal flows off the terrace into the channel, while the more viscous slag is stranded on the horizontal face. Successive terraces can further improve separation of slag from the liquid metal until, at the outlet, the liquid metal is substantially free of slag contamination.

The invention anticipates various terrace configurations. Factors influencing the choice of configuration include the type or grade of liquid metal, the impact of the flow onto the ladle bottom, gas purging elements, and the geometry of the ladle. The uppermost terrace may be higher, that is, thicker, or more or less numerous to accommodate more energetic flow, corrosive metals or ladle geometry.

Obviously, numerous modifications and variations of the present invention are possible. It is, therefore, to be understood that within the scope of the following claims, the invention may be practiced otherwise than as specifically described.

What is claimed is:

1. A ladle bottom adapted for use in a ladle for molten metal applications, the ladle bottom comprising:
    a) a plurality of lower faces including at least one outlet face defining an outlet and one sloping face inclined upwards from the outlet face towards at least one intermediate face;
    b) a plurality of sidewalls extending upward from the lower faces, thereby defining at least a single flow channel, the flow channel forming a single outlet channel at the sloping face; and
    c) a plurality of uppermost faces above the lower faces relative to the outlet and at least substantially separated by at least one flow channel, whereby the uppermost faces are adapted to preferentially capture slag while the flow channel permits the molten metal to drain toward the outlet.

2. The ladle bottom of claim 1, wherein the ladle bottom comprises at least three uppermost faces.

3. The ladle bottom of claim 1, wherein the uppermost faces are substantially horizontal.

4. The ladle bottom of claim 1, wherein the uppermost faces are at different heights relative to the outlet.

5. The ladle bottom of claim 1, wherein the intermediate face has an inclination towards the sloping face and the inclination is less than an inclination of the sloping face.

6. The ladle bottom of claim 1, wherein the sloping face is substantially vertical, and the sloping face and the sidewalls define a well around the outlet face.

7. The ladle bottom of claim 1, wherein the sidewalls are substantially perpendicular to the faces.

8. The ladle bottom of claim 1, wherein the flow channel has a plurality of branches.

9. The ladle bottom of claim 8, wherein the branches include at least one feeder branch and an outlet branch, the feeder branch being higher above the outlet than the outlet branch.

10. The ladle bottom of claim 8, wherein the feeder branch are is shallower than the outlet branch.

11. A ladle bottom adapted for use in a ladle for molten metal applications, the ladle bottom comprising:

a) at least one outlet face defining an outlet;
b) one sloping face having a lower end inclined upwards from the outlet face and an upper end;
c) at least one intermediate face contacting the upper end of the sloping face;
d) a plurality of sidewalls extending upward substantially perpendicular from the outlet face, sloping face and intermediate face, thereby defining at least one flow channel including at least a single feeder branch and a single outlet branch at the sloping face; and
e) a plurality of uppermost faces above the intermediate face and at least substantially separated by the feeder branch, whereby the uppermost faces are adapted to preferentially capture slag while the feeder branch permits the molten metal to drain toward the outlet branch and the outlet.

* * * * *